United States Patent
Olesen et al.

(10) Patent No.: US 10,154,401 B2
(45) Date of Patent: Dec. 11, 2018

(54) SAFETY DEVICE UTILIZING A BEACON

(71) Applicant: BeaconWatch, LLC, Huntington, NY (US)

(72) Inventors: Henning L. Olesen, Doylestown, PA (US); William F. Wilkes, Centerport, NY (US)

(73) Assignee: BEACONWATCH, LLC, Huntington, NY (US)

( * ) Notice: Subject to any disclaimer, the term of this patent is extended or adjusted under 35 U.S.C. 154(b) by 0 days.

(21) Appl. No.: 14/747,822

(22) Filed: Jun. 23, 2015

(65) Prior Publication Data

US 2015/0373521 A1     Dec. 24, 2015

Related U.S. Application Data

(60) Provisional application No. 62/015,925, filed on Jun. 23, 2014.

(51) Int. Cl.
*H04W 4/02* (2018.01)
*H04W 4/90* (2018.01)
(Continued)

(52) U.S. Cl.
CPC ............... *H04W 4/90* (2018.02); *B63C 9/00* (2013.01); *G08B 21/0211* (2013.01); *G08B 21/0277* (2013.01); *G08B 21/0283* (2013.01); *G08B 21/0291* (2013.01); *G08B 21/0294* (2013.01); *H04W 4/02* (2013.01); *H04W 4/80* (2018.02)

(58) Field of Classification Search
CPC ......... H04W 4/02; H04W 4/22; H04W 4/025; H04W 4/026; H04W 4/027; H04W 68/005; H04W 76/007; H04W 68/02

USPC ......... 455/404.1, 404.2, 414.1, 456.1, 456.2, 455/456.3, 566, 567

See application file for complete search history.

(56) References Cited

U.S. PATENT DOCUMENTS 5,006,831 A     4/1991   de Solminihac
5,497,149 A  *  3/1996   Fast ..................... B60R 25/102
                                              340/426.19
(Continued)

FOREIGN PATENT DOCUMENTS

EP         2208084 A1     7/2010

OTHER PUBLICATIONS

F. Michahelles, P. Matter, A. Schmidt, and B. Schiele. Applying Wearable Sensors to Avalanche Rescue. Computers and Graphics, 27(6):839-847, 2003.

*Primary Examiner* — Jean A Gelin
(74) *Attorney, Agent, or Firm* — Kunzler, PC

(57) ABSTRACT

A system for enhancing the safety of one or more persons includes a Personal Safety Beacon (PSB) device that is coupled with a person being monitored. The PSB device is configured to perform a plurality of measurements indicative of environmental conditions encountered by the person being monitored. The PSB device is also configured to transmit a unique identifier associated with the PSB device. The system further includes one or more portable electronic devices that are in continuous communication with the PSB device. The one or more portable electronic device hosts a monitoring application that monitors the person. The monitoring application is configured to notify a user upon detecting one or more hazardous or unsafe conditions based on the information provided by the PSB device.

20 Claims, 6 Drawing Sheets

(51) Int. Cl.
  *G08B 21/02* (2006.01)
  *B63C 9/00* (2006.01)
  *H04W 4/80* (2018.01)

(56) References Cited

U.S. PATENT DOCUMENTS

| | | | |
|---|---|---|---|
| 6,057,759 | A | 5/2000 | Marsh |
| 6,469,641 | B1 | 10/2002 | Lash et al. |
| 7,116,272 | B2 | 10/2006 | Wolf et al. |
| 7,695,335 | B2 | 4/2010 | Ricciuti et al. |
| RE42,149 | E | 2/2011 | Courtney et al. |
| 8,668,643 | B2* | 3/2014 | Kinast .................. A61B 5/0031 600/300 |
| 8,810,426 | B1* | 8/2014 | Morris ..................... G08B 3/10 116/137 R |
| 2006/0099969 | A1* | 5/2006 | Staton ................ G08B 21/0211 455/456.4 |
| 2006/0252999 | A1* | 11/2006 | Devaul ................ A61B 5/0024 600/300 |
| 2006/0262761 | A1* | 11/2006 | Tsunekawa ........... H04W 24/08 370/338 |
| 2007/0241261 | A1* | 10/2007 | Wendt ..................... G01D 9/005 250/221 |
| 2009/0203349 | A1* | 8/2009 | Hollstien ............. G08B 25/016 455/404.1 |
| 2009/0219160 | A1* | 9/2009 | Shervey ................ B63C 9/0005 340/573.6 |
| 2009/0326339 | A1* | 12/2009 | Horvitz .................. G06Q 10/00 600/301 |
| 2011/0133927 | A1* | 6/2011 | Humphrey ............. A62B 9/006 340/539.11 |
| 2011/0136476 | A1* | 6/2011 | Beasley ............ H04M 1/72577 455/414.1 |
| 2012/0050046 | A1* | 3/2012 | Satorius .............. G06F 19/3418 340/573.1 |
| 2012/0127924 | A1* | 5/2012 | Bandyopadhyay ..... E21F 17/18 370/328 |
| 2013/0339019 | A1* | 12/2013 | Giancarlo ............... G10L 15/04 704/251 |
| 2014/0191873 | A1* | 7/2014 | Kreiner ............. H04M 1/72569 340/604 |
| 2014/0336920 | A1* | 11/2014 | Burrell ................. G01C 21/206 701/409 |
| 2015/0022316 | A1* | 1/2015 | Dixon .................. G08B 25/001 340/5.51 |
| 2015/0077244 | A1* | 3/2015 | Lyman ................ G08B 25/016 340/539.12 |
| 2015/0077737 | A1* | 3/2015 | Belinsky ................. G01N 21/53 356/51 |
| 2015/0081136 | A1* | 3/2015 | Sutherland ........... G08B 21/043 701/2 |
| 2015/0254970 | A1* | 9/2015 | Sloo ........................ G01N 27/02 340/506 |
| 2016/0203694 | A1* | 7/2016 | Hogasten ............. G08B 21/043 348/164 |
| 2017/0303087 | A1* | 10/2017 | Wirola ................ H04W 64/003 |

* cited by examiner

SAFETY DEVICE UTILIZING A BEACON

CROSS REFERENCE TO RELATED APPLICATIONS

This application claims priority to U.S. Patent Application Ser. No. 62/015,925 filed Jun. 23, 2014 which is incorporated by reference in its entirety.

FIELD OF THE INVENTION

The present invention generally relates to electronic safety devices and in particular to an electronic personal safety device utilizing a beacon.

BACKGROUND OF THE INVENTION

Even those people who pay great attention to their safety and security, quite often can find themselves having to deal with unforeseen emergencies requiring help. Typically, most individuals do not carry the means to alert others to their situation. While two-way radios, locator beacons and GPS alert systems do offer the ability to call for help, the vast majority of individuals engaging in recreational activities do not utilize these solutions as they are often costly, subscription-reliant, require independent licensing, are ill-suited for their specific needs or conflict with the users desire to carry other fun-based electronic devices with them outdoors.

Mobile and wireless technology have touched our lives in a multitude of ways ranging from communicating with friends and family to managing different aspects of our personal and business functions. Mobile technology is now also making a foray into personal safety management given the broad range of features and functions it possesses to facilitate things like transmitting various signals for assistance.

The drawback with handheld devices is that users need to visually look at the phone in order to use it. It is very hard to try to use the mobile device in a concealed or hidden way. If the mobile device is in a person's pocket, bag or purse, it makes it that much more difficult to try to access it, look at the device and use it for a particular purpose. And one cannot figure out the current state of the device or operate any of the functions without actually looking at it.

Thus, it is desirable to provide a personal safety device that is light, reliable, effective and adaptable to many different activities and circumstances and capable of being automatically deployed.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

The embodiments of the present invention are directed to improved methods, apparatus and system for enhancing the safety of one or more persons. The system includes a Personal Safety Beacon (PSB) device that is coupled with a person being monitored. The PSB device is configured to perform a plurality of measurements indicative of environmental conditions encountered by the person being monitored. The PSB device is also configured to transmit a unique identifier associated with the PSB device. The system further includes one or more portable electronic devices that are in continuous communication with the PSB device. The one or more portable electronic device hosts a monitoring application that monitors the person. The monitoring application is configured to notify a user upon detecting one or more hazardous or unsafe conditions based on the information provided by the PSB device.

The improved method for enhancing the safety of one or more persons includes coupling a Personal Safety Beacon (PSB) device with a person being monitored. The method further includes performing, by the PSB device, a plurality of measurements indicative of environmental conditions encountered by the person being monitored. The method also includes transmitting, periodically, a unique identifier associated with the PSB device to one or more portable electronic devices that are in continuous communication with the PSB device. The transmission includes information related to the plurality of measurements performed by the PSB device. The method further includes monitoring a status of the person being monitored by a monitoring application that is hosted by the one or more portable electronic devices based on the information provided by the PSB device.

BRIEF DESCRIPTION OF THE DRAWINGS

The accompanying appendices and/or drawings illustrate various non-limiting, examples, inventive aspects in accordance with the present disclosure.

DETAILED DESCRIPTION OF CERTAIN EMBODIMENTS

Figure 1:
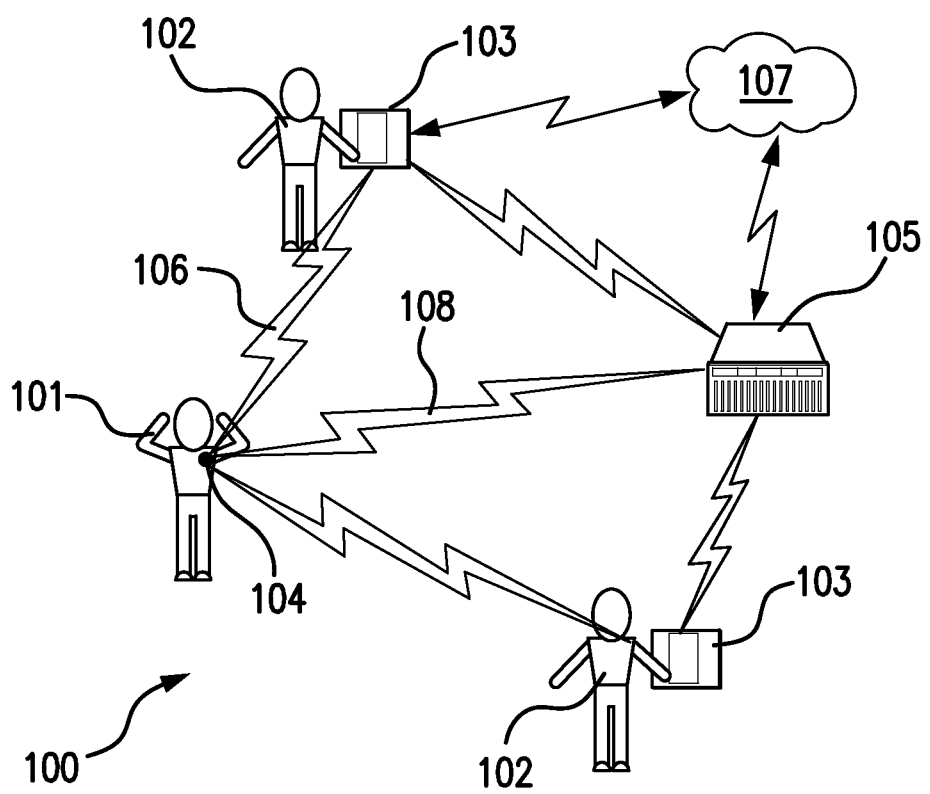
FIG. 1 is a block diagram illustrating a personal safety system utilizing a Personal Safety Beacon (PSB) device in accordance with an embodiment of the present invention.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the illustrated embodiments are not to be limited by what has been particularly shown and described, except as indicated by the appended claims.

In the written description, herein, the term "person" will be used to refer to any, or all of, persons, animals, children, impaired people considered to be in potentially hazardous environments.

As used herein, the term "personal electronic device" includes any small, moderately light, electronic portable device carried by a person such as, but not limited to, a smart-phone, health band, smart-watch, tablet, iBeacon™, iPhone™, iPad™, Apple Watch™ (the latest four available from Apple, Inc.), Bluetooth Watch, smart-watch, tag, beacon, laptop, and other similar multi-function or multi-purpose electronic accessories.

As used herein, the term "Personal Safety Beacon (PSB)" refers to a beacon device which transmits a unique identifier, either sequentially, continuously, randomly and/or in response to an inquiry. The beacons may be electric elements which transmits, for example broadcast, a beacon data over a signal encoded according to known protocols, such as Bluetooth™ ZigBee™, Wi-Fi™, cellular, and Near Field Communication (NFC). A reference to "Bluetooth" is not a limiting reference to the use of Bluetooth as the transmission air interface, but may refer to any wireless interface inclusive of those describe in this paragraph.

Various embodiments of the present invention are directed to a safety system that provides the usability advantages of a passive safety system, but includes the benefits and intelligence of an active safety system in a potentially dangerous environment. The system comprises personal equipment, handheld remote terminals, and/or handheld smart phones, and optionally permanently installed equipment on associated vehicles. The personal equipment includes use of a small battery operated wireless beacon that may be folded inside the fold (or pocket) of a life jacket, raincoat, and/or garment, or may be worn on the person such as for example a watch. The wireless beacon can operate for an extended period of time, for example two years or longer, without a battery replacement or required battery charge. The remote terminal, smart phone, or similar personal handheld device may comprise a beacon reception device that may be decoded by software on the terminal to facilitate emergency, and/or rescue services when needed. The installed equipment may communicate with either, or both, the remote terminal, personal equipment, and/or similarly equipped safety personnel.

Referring now to the Figures in detail, FIG. 1 is a block diagram illustrating a personal safety system utilizing a PSB device in accordance with an embodiment of the present invention. As illustrated in FIG. 1, a safety beacon system 100 may be utilized by one or more person(s) 101 that may be at risk from a hazardous environmental conditions described below, and one or more users 102 who possess personal electronic devices 103 that are enabled to monitor the person(s) 101 who wear a PSB device 104. The PSB 104, and personal electronics 103, may be enabled to communicate with one another via links 106 to facilitate an improved location determination mechanism. In an embodiment, the safety beacon system 100 may further comprise a system monitor 105 that facilitates the monitoring of users 102 and/or person(s) 101. The PSB 104 may also be enabled to communicate via a link 108 with the system monitor 105.

As used herein, the term "user" refers to a searcher that possesses one or more personal electronic devices 103 (capable of receiving Bluetooth wireless transmissions) who is interested in determining the location of person(s) 101 in distress. In various embodiments, the location determination may be facilitated by software application running on, and/or in, the personal electronic device 103. In a preferred embodiment, the software application enables the identification and location of person(s) in distress without the prerequisite for the searcher/user 102 to be aware of the requirement for, and/or initiate, the search using a complicated or lengthy protocol (e.g., power on and configuration of the device used for location and/or hazardous conditions awareness assistance). To elucidate further, at least in some embodiments, the use of personal electronics 103 for the identification of a hazardous condition may be transparent to the user 102 and/or the person(s) 101. According to an embodiment of the present invention, the software application may be preconfigured to communicate with one or more PSBs 104, and optionally other users 102 of personal electronics 103, to enable the identification of the occurrence of person(s) in distress and to facilitate their timely location and rescue. The software running on and/or in the personal electronics 103 may be referred to hereinafter as a "companion monitor" application described in greater detail below. The companion monitor application and/or PSB 104 may also be referred to as a "companion software application", "monitor application", and the like.

The companion monitor application may include a logging facility that logs the PSB's 104 status and alarm trigger indications. A logging facility may also support context awareness of the person(s)' 101 activities, and facilitate an improved response time using the said context awareness. Alternatively the PSB 104 may include an onboard logging facility that may be inquired for by the companion software.

The companion monitor application running on personal electronics device 103 may also provide a remote monitoring capability of its status including an interface to a cloud-based service, and/or a social network. Examples of these services include, but not limited to, Facebook, Twitter, iCloud, Instagram, Google+, and many other similar services. A cloud-based service may also be a proprietary implementation to provide a remote dashboard capability to enable the monitoring of users 102, and person(s) 101 in a remote or central location. A non-limiting example includes a cloud-based dashboard service for the monitoring of the status of firefighters fighting a fire in a building. Such remote monitoring capability may allow a fire captain to identify and manage hazardous conditions that may affect several firefighters in a similar hazardous condition. According to an embodiment of the present invention, to provide such remote monitoring capability, the system monitor 105 may be connected to the cloud 107. The cloud 107 may be further connected to the Internet, which may facilitate a web-based dashboard for monitoring of the hazardous environment using an exemplary monitoring system 105.

Various embodiments of the present invention contemplate that the safety beacon system 100 may be utilized by users 102 for activities in potentially hazardous environments. These potentially hazardous environments may include, but are not limited to, any of the following: activities in marine environments, winter activities, activities in fire and/or smoke environments, vehicular activities, and the like. The activities in marine environments may include those on marine vessels located in remote nautical locations such as the open ocean. The winter activities may include hiking, skiing, snowboarding, and/or snowshoeing in locations that carry the risk for avalanche. The activities in fire and/or smoke environments may include any firefighting and/or rescue operations in buildings that contain fire, smoke, or both. The vehicular activities include activities involving a vehicle having a risk for collisions, and/or exposure to hazardous environments due to inclement weather, floods, earthquakes, etc. It is noted that vehicles may also be used for emergency response, first responder activities, and recovery of injured person(s) 101 in, for example, an earthquake recovery situation. Other non-limiting applications of the safety beacon system 100 include activities such as monitoring persons at risk of harm and monitoring of children in potentially dangerous situations.

Figure 2:
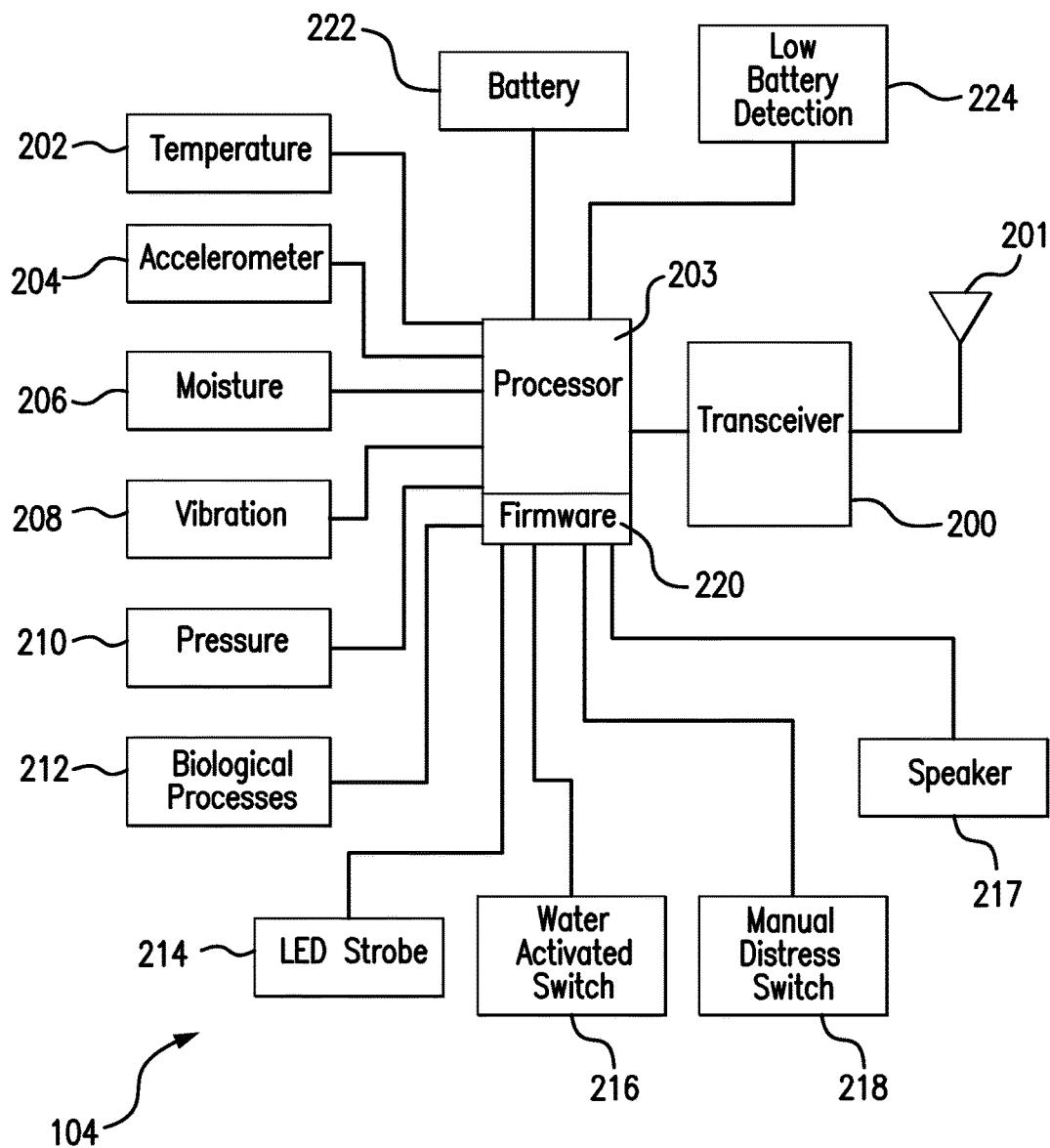
FIG. 2 is a block diagram illustrating internal components of the PSB device of FIG. 1 in accordance with an exemplary embodiment of the present invention.

FIG. 2 is a block diagram illustrating internal components of the PSB device of FIG. 1 in accordance with an exemplary embodiment of the present invention. In this exemplary embodiment the PSB device 104 may be implemented as a Radio Frequency (RF) beacon which utilizes commonly available Bluetooth specifications for communication of the person's 101 location. Described RF beacons are characterized by their ability to be enabled without the necessity for configuration or other enablement (e.g. power on) requirements. As such the use of the PSB device 104 may be considered transparent to the person(s) 101 that are wearing it.

According to one aspect of the present invention, the PSB device 104 may have a very small size. For example, it may be approximately one inch in diameter. Such PSB device 104 may be suitable for hiding in a sleeve, fold, or pocket of a life preserver, a boater's foul weather jacket, ski jacket, or a fireman's firefighting apparatus, first responder's jacket, raincoat, shoe, hat, and/or garment. It may be suitable for use on a lanyard, or a dongle. In some embodiments, the PSB device 104 may also be disguised for example as jewelry, a broach, a watch, or as a pendent around a person(s)' 101 neck.

RF wireless beacon transmissions may be enabled through the use of a transceiver 200. The transceiver 200 may comprise a battery 222 (or another power supply), antenna 201, interface I/O ports, control I/O ports, processor 203, and RF radio 200. The transceiver 200 may also be able to support deep sleep, micro-sleep, sleep, standby, and normal modes of operation. It may support one or more antennas 201 and one or more simultaneous data streams.

In one embodiment, person(s) 101 may wear, hold, or may be co-located with the PSB 104 that transmits a RF wireless waveform. The RF wireless waveform used by the PSB 104 for wireless transmissions may conform to one of many wireless transmission specifications such as Bluetooth, Low Energy (LE) Bluetooth, WLAN, 802.11, 802.16, 802.15.4, ZigBee™, Ultra-Wideband (UWB), Universal Mobile Telecommunications System (UMTS), Long Term Evolution (LTE), LTE Advanced, Machine Type Communications (MTC), Dedicated Short Range Communications (DRSC), and/or other similar wireless specifications. It is understood that for ease of description only the term "Bluetooth" is used herein to refer to these transmissions, however, in various embodiments, the term "Bluetooth" may be inclusive of any or all of the above or similarly suitable transmission specifications and associated protocols. These wireless transmissions may be triggered from a physical and/or wireless, external, periodic, a-periodic and/or continuous event. They may also be triggered from an anomalous external event. As a non-limiting example, a person's 101 fall and the subsequent impact may cause the PSB 104 to trigger the RF wireless transmissions.

The exemplary RF wireless frequencies utilized by PSB 104 may include one or more frequencies including, from approximately 400 kHz to approximately 500 kHz, from approximately 400 MHz to approximately 920 MHz, from approximately 2.2 GHz to approximately 5.2 GHz, and millimeter wave frequencies. It is understood that any frequency inclusive of these and any other suitable frequency may be supported by the PSB's 104 operation. The PSB 104 may also support multi-band operation, namely it may support operation on more than one frequency at the same time, and/or for the same operation.

As shown in FIG. 2, The PSB processor 203 of the PSB device 104 may interface with one or more measurement capabilities that further aid in the recovery and/or location of person(s) in distress, including the ambient temperature 202, accelerometer 204, environmental moisture 206, vibration 208, and atmospheric pressure or a barometer 210. Biological processes sensor 212 may include a device capable of measuring one or more of the following processes: a person(s)' 101 heart rate, blood pressure, sweat index, shiver index, body temperature, oxygen level, dialyses status, and/or respiration status. Other measurement sensors may also be supported including fume, gas, acceleration, shock, glucose, light, and radiation sensors. An LED strobe 214 may provide a visual identification of the person(s)' 101 status and or location. The LED strobe 214 may emit a sequence of flashes that may be used to indicate the wearer's status. For example, three short flashes followed by three long flashes and another three short flashes may indicate an emergency by the wearer. A water-activated switch 216 may provide an external indication of the presence of moisture and/or water to the PSB 104. A speaker, or piezo-electric buzzer 217, may also facilitate identification of a person(s) 101 status. A manual distress switch 218 may provide person(s) 101 a means to indicate a hazard condition to alert the user(s) 102, and/or system monitor 105. A battery 222 may be monitored by a low battery detection circuit 224, and may provide a means to alert person(s) 101 and/or users 102 to a low power condition.

The PSB 104 may utilize either a permanent, replaceable, and/or a rechargeable battery. A rechargeable battery may utilize a USB interface for recharging, or a wireless means for recharging. The PSB 104 may also utilize a mechanical means for recharging, for example, a weighted pendulum may be used for generating a recharging current. In some embodiments, the PSB 104 may inform a monitor application of its battery status. The monitor application may provide the user 102 with information regarding the status of the battery, including providing sufficient warning when the battery level gets low. A battery 222 may be replaceable by the person(s) 101, and/or users 102. The PSB 104 may store firmware 220 in onboard static memory that may be updated over the air from either the companion software 301 and/or the OBU 300 (both shown in FIG. 3). Further, the PSB 104 may communicate its health and/or status to users 102, person(s) 101, personal electronics 103, OBU's 300, and/or other PSB's 104. The indication of the PSB's 104 health and/or status may include its battery level, its temperature, moisture, battery age, time since last power on, GPS condition, and/or sleep period.

In one embodiment, the battery 222 may be able to last an extensive period of time, for example years, without the necessity of additional power saving methods, power switch, or power supply control. For example, to save battery life, the PSB 104 may be able to control its power, transmission power, and/or transmission period, based on the immediate environmental conditions, and only increase its power when necessary such as upon automatic determination of when the person(s) 101 becomes entrapped in an avalanche, or when users 102 are actively attempting to locate the person(s) 101. The PSB 104 may also control the function of peripherals such as a LED strobe 214 to save power. For example, the PSB 104 may control when the LED strobe 214 is on, and/or the frequency of use of the LED strobe 214. In such embodiment, the PSB 104 may be active and available for use for an extensive period without the necessity for the intervention by the person(s) 101 using it or relying on it. This is important since devices, which are intended to insure the safety of personnel during an emergency, should be available and operable with minimal intervention or maintenance by the person(s) relying on them.

It is noted that the PSB 104 may not be required to contain a GPS capability to facilitate the embodiments of this invention. Because the PSB 104 does not require GPS reception it may be used in locations where reception of GPS signals may be impaired such as indoors.

Although the PSB 104 is not required to contain a GPS capability, in one embodiment, the PSB 104 may include a GPS or equivalent location assistance capability to supplement the micro-location and measurement capabilities of the PSB 104 with the enhanced location capabilities of the GPS. The PSB 104 may also utilize a miniature geospatial inertial measurement unit for an on chip integrated navigation system suitable for replacing and/or supplanting the functions provided by access to a GPS satellite positioning system, and those of the PSB 104.

Advantageously, the PSB device 104 may be built using a color coding scheme. For example, the PSB 104 may be built using the colors red, blue, green, and yellow. The color scheme may be used to associate the PSB 104 with a particular user 102. A color may allow the user 102 to easily associate the PSB 104 with personal electronics 103, as belonging to them. In a related embodiment, a pattern utilizing color and/or unique designs may be used to associate a PSB 104 with a user 102. In an alternative embodiment a bar code, or QR (Quick Response) code, may be used instead, or in addition to various color coding schemes for PSB/user association purposes. In the embodiment wherein a QR code is used, the personal electronics device 103 may scan the QR code to derive the PSB's 104 identity and associate it with a particular user 102. A wireless signature emitted from the PSB 104 may also supplement the identification of a PSB to a particular user 102.

As another advantage, biological process measurements provided by biological processes sensor 212 may be monitored by the PSB 104 for use by user(s) 102 to facilitate the safety and rescue of person(s) 101. For example, if an avalanche victim's temperature drops considerably, the PSB 104 may alert searchers regarding a risk related to hypothermia. In a similar fashion, firefighters whom are monitoring one another during a fire may be alerted by PSB 104 upon detection of a hazardous condition with a firefighter by monitoring his ambient and/or bodily temperature or air quality status.

As yet another advantage, the PSB 104 may include functionality that enables users 102 to locate person(s) 101 using either audible or visual emissions. For example, the PSB 104 may be equipped with aforementioned high intensity led strobe 214 that may be triggered using either a manual, wireless, and/or autonomous activation. The activation of an audible and/or visual strobe may also provide an indication to other PSB(s) 104, and/or OBU(s) 300, of the distress condition. The PSB 104 may also include the facility for a manual activation of a distress signal by use of an easily accessible switch 218 on the PSB enclosure. The switch 218 may serve a multi-function role wherein the switch operation may also control the LED function, PSB alert status, or other PSB functions.

In one illustrative embodiment, the PSB 104 may support over the air firmware 220 upgrade facilities to enable the PSB 104 to be upgraded with enhanced features. An upgrade may be initiated from the companion software application 301 on the personal electronics device 103, or may be automatic without the need for the user 102 to upgrade the device themselves. Firmware upgrades may be supported through unattended background services from the companion software to facilitate ease of use for the end user. In the event a PSB firmware 220 version becomes too old, or is the incorrect version for the intended operation, the PSB 104 may maintain a capability to inform the user 102 for the need of an upgrade, or firmware update, using a notification feature on the companion software 301.

Figure 3:
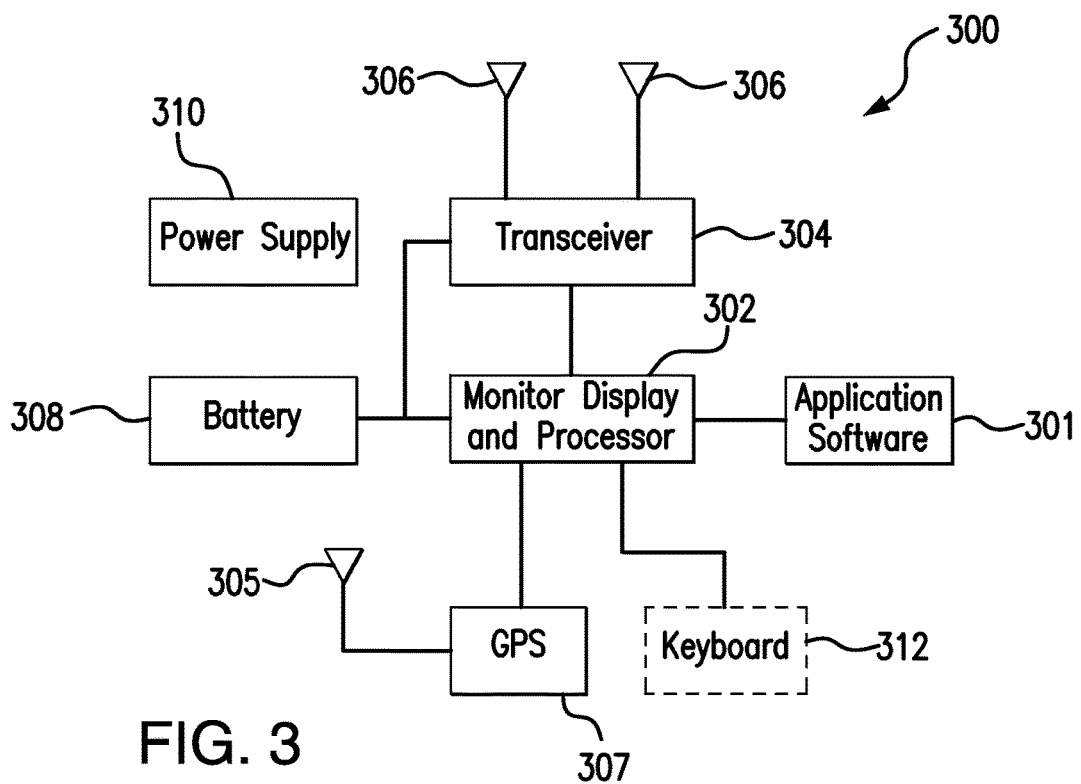
FIG. 3 is a block diagram illustrating internal components of the PSB device of FIG. 1 implemented as On Board Units (OBUs) in accordance with an alternative embodiment of the present invention.

As illustrated in FIG. 3, the location and/or status of person(s) 101 in distress may be facilitated by software on equipment that is permanently, or semi-permanently, installed on vehicles, and/or animals, which may be referred to as OBU equipment 300. OBU equipment 300 may be located in or near the environments where person(s) 101 may be at risk for harm from hazardous conditions. OBU equipment 300 may also be permanently installed on or in marine vessels, fire/rescue vehicles, snow rescue vehicles, carried by animals, for example in a saddle on a horse. OBU equipment 300 may also be installed in aircraft. For example, OBU equipment 300 may be installed in or on a drone that may be used to facilitate the identification and notification of person(s) 101 that are in a hazardous condition. Users 102 in the vicinity of person(s) 101 operating either, vehicles, machinery, drones, etc. may use the methods described herein to facilitate the enhanced safety of said person(s) 101. As an exemplary embodiment this equipment may facilitate the assistance of the location of person(s) 101 in distress. For example, OBU equipment 300 may include the ability to provide location assistance to users 102 or searchers, and/or communicate with the personal electronics 103 that users 102 may have available for facilitating the location and status of person(s) 101 in distress.

The OBU 300 may consist of a monitor display and processor 302, and a transceiver 304. The transceiver 304 may be configured with one or more antennas 306 to facilitate Bluetooth communications with personal electronics 103, and/or PSB's 104. The OBU 300 may monitor one or more user's 102 personal electronics 103, and/or PSBs 104. The OBU 300 may also be enabled to communicate with the cloud 107. To support an improved or enhanced PSB 104 location determination the OBU 300 may be enabled to receive GPS signals using a GPS receiver 307 or similar navigational facility such as C-SPAN. The GPS receiver 307 may use the same antennas 306 as the OBU 300, or separate antenna(s) 305 specifically for reception of GPS signals. For power, the OBU 300 may use an enhanced capacity battery 308, or a permanent power supply source 310, such as a generator. For user input purposes, the OBU 300 may either be configured with a keyboard 312, a touch screen interface with the monitor, or a remote configuration facility such as a web based control interface through the cloud 107. The OBU display 312 may convey similar information as the personal electronics 103 described herein.

OBU equipment 300 may also facilitate the calibration of the PSB(s) 104. OBU equipment 300 may include more detailed calibration, and/or diagnostic, capabilities than the companion monitor application 301. The OBU 300 may also provide monitoring capabilities which allow the remote monitoring of PSB's 104 and person(s) 101 status including the ability to provide an autonomous and independent indication to a user, or users 102, of person(s) 104 who may be entering, or are already in, a hazardous condition.

OBU equipment 300 may also have additional components enabled to facilitate the calibration of the PSB(s 104). For example, the OBU equipment 300 may also provide monitoring capabilities which allow the remote monitoring of PSB's 104, and person(s) 101, status including the ability to provide an autonomous and independent indication to a user 102, or users, of person(s) 101 who may be entering, or in, a hazardous condition.

In a one illustrative embodiment, the PSB 104 may include a "beacon watch" capability. According to this embodiment, a beacon that has been entered in a beacon watch mode may autonomously update the companion software 301 of its status. A beacon watch mode may be enabled manually by the person(s) 101 using a switch 218 or similar facility at the PSB 104, and/or it may be enabled remotely using the companion software 301, for example, at the OBU 300.

Figure 4:
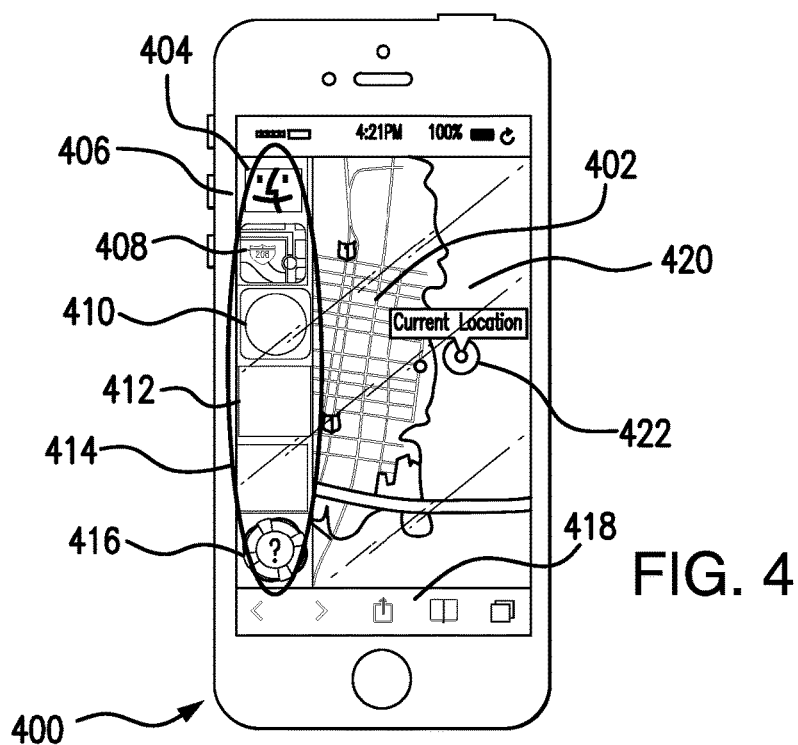
FIG. 4 illustrates a representation of a personal electronics device, which may perform various functions of the PSB device in accordance with an embodiment of the present invention.

FIG. 4 illustrates a smart-phone 400 as a representation of personal electronics 103 that may be used in various embodiments of the present invention. A user 102, may possess personal electronics 103 that receive Bluetooth wireless transmissions to enable the identification and location of person(s) 101 in distress. Other examples of personal electronics that may facilitate the methods described in the invention include iPhone, Apple Watch, iWatch, iPad, iBeacon, Samsung Galaxy, HTC One, Nokia Lumia, health band, Samsung Gear Fit, and/or other similarly wireless Bluetooth equipped portable devices. Advantageously, the user's 102 use of the personal electronics 103 may not require the user 102 to be aware of the requirement for initiating the search using a complicated or lengthy protocol (e.g., power on and configuration of the device used for location and/or hazard awareness assistance). The personal electronics 103, or smart phone 400, may contain and run companion software application 301. The companion software application 301 may consist of many functions to enable the embodiments described herein.

Different functions may be selected with the companion software 301 through the use of icons that may be presented to the user using a touch interface 402, for example an icon ribbon 406, with a swipe gesture, configuration panel, or custom gesture definition. The touch interface 402 enables simple access for users 102 that may be required to use the interface in challenging conditions. Swipe gestures and large icon push buttons are two known methods to enable this type of interface. A representative sample of the functions that may be enabled through the icon ribbon 406 include user configuration facilities 404, location awareness of the location of person(s) 408, man overboard tracking and recovery in a marine or other hazardous environment 410, avalanche recovery 412, PSB configuration and status support 414, and help facilities 416. The companion software' 301 interface may also have a task bar 418 that is available, for example at the bottom of the screen, that provides smart-phone 400 navigation facilities. Controls the navigation facilities provided include the ability to scroll through the companion software 301 functions, connections with other people via SMS, or social networks, related Internet resources, and historical information. The touch interface 402 of the companion software 301 provides the interface for the various functions. For example, for the tracking and recovery in a marine or other hazardous environment the main window may provide the representation of a map 420 with gesture controls for navigating the map and embedded labels 422 for identifying person(s) 101 and/or users 102 on the map 420. Different maps for different hazardous environments may be displayed, for example, a ship may be displayed in an ocean for hazard recovery and location assistance on a ship.

In an embodiment of the present invention, the companion monitor application 301 may include functionality for calibrating the PSB 104. Since the distance from the user 102 to the person(s) 101 may be determined from a formula which utilizes a combination of the transmit power and the signal path loss to the person(s) 101, the companion monitor application 301 may be required to calibrate the PSB 104 to determine the correct distance during an initial setup of the PSB 104. Other parameters that may be required for the distance calibration may include, without limitations: the PSB model, PSB configuration, and/or PSB receiver sensitivity. The calibration capability may include procedures for accounting for pre-determined transmit power levels. For example if the PSB 104 supports both low and high transmit power, the calibration procedure may permit the use of this information as a parameter to the calibration procedure. A calibration procedure may only need to be performed once, for example when the battery 222 in the PSB 104 is replaced, or recharged, or may be done using a periodic schedule such as for example once per year.

The companion software application 301 may use unique display methods for indicating the status of person(s) 101. For example, the companion software's screen may change color based on the person(s) status, such as, for example, green may be indicative of normal status, yellow indicative of at risk status, and red indicative of, in danger status.

In some embodiments, the use of personal electronics 103 may replace the use of a PSB 104. For example, an iPhone, Smart Watch, Apple Watch, health band, and/or other similarly wireless Bluetooth equipped devices may be able to support the features of the PSB 104 contemplated by various embodiments described herein.

In alternative embodiments, similarly to OBU equipment 300 described above, the companion monitor application 301 may also include the functionality to monitor the status of the PSB(s) 104 including their battery level, trigger status, hazard events, acceleration events, PSB temperature, strobe status and/or function, and other related parameters including their history. If the PSB 104 is equipped with a GPS, or similar location determination capability, the monitor application 301 may control and/or monitor the operation of the GPS or location determination function. The companion monitor application 301 may also control the power consumption of the PSB 104 by enabling, or disabling, specific functions and/or features of the PSB 104.

Figure 5:
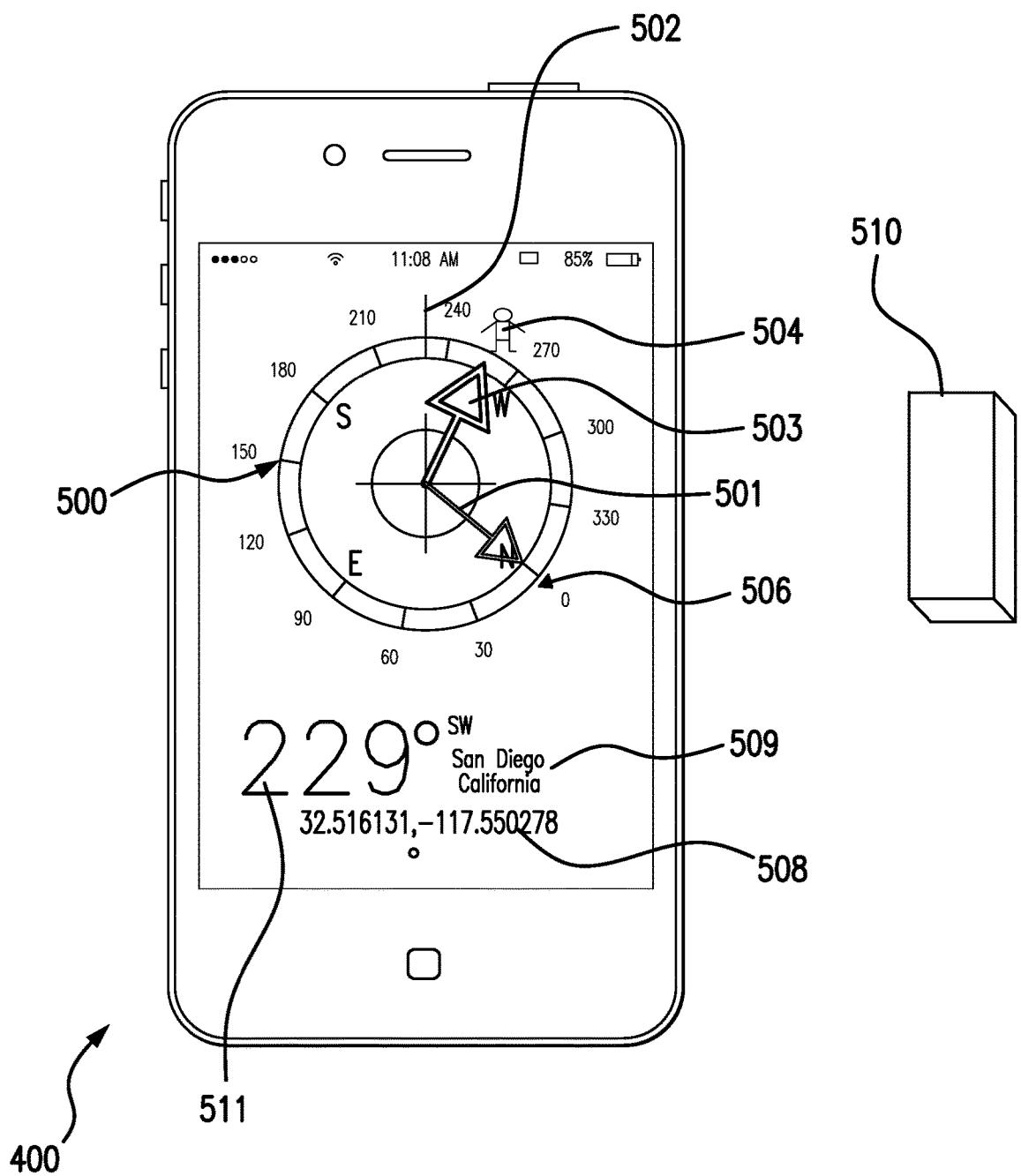
FIG. 5 illustrates a software application that may be used with a personal electronics device of FIG. 4 in accordance with an embodiment of the present invention.

FIG. 5 illustrates the use of a software application that may be used with a personal electronics 400 device of FIG. 4 for the recovery of a man overboard or lost personnel in a marine environment. With this exemplary embodiment a compass 500 may be used for the assistance in locating the person(s) 101 in distress. A compass bearing 501 may be used to provide a compass heading 502 and provide the direction 503 to the person(s) 101 in distress 504. The compass 500 may also provide an indicator of the average and/or instantaneous heading to the start position of the search 506. An indication of the current coordinates, for example, longitude, and latitude of the user's 102 position may also be indicated 508. The user's 102 nearest recognizable point of reference for their position may also be displayed, for example a nearby city 509. A digital representation of the heading to the person(s) 101 in distress may also be presented 511. A representation of a PSB dongle 510 for which the compass 500 provides an indication is also illustrated in FIG. 5.

The companion software 301 may determine the direction, and/or relative location, of person(s) 101 by a combination of any, or all, of the PSB's 104 signal strength, waveform signature, estimated relative distance to the PSB 104 using an estimate of the wireless channel's path loss, and may also leverage triangulation of the person(s)'s 101 PSB location by communicating with other user's personal electronics 103, and/or OBU 300 equipment, and using the above in combination with a localization algorithm to obtain a more accurate estimate of the person(s) 101 location.

The localization algorithm may be distributed using the estimate of the path loss, and transmission power, from one or more PSBs 104 and OBUs 300. In various embodiments, statistical refinement of the person(s) 104 position may be continually updated either in the background, or during the event of a hazardous condition. The position of person(s) 104 may be further refined using a known GPS position from the companion monitor application 301 either using the personal electronics 103, and/or OBU(s) 300, or both. The use of a GPS position may be used in combination with the either the relative location, or the statistical refinement algorithms, to further improve the location estimation accuracy. In addition, as noted above, a GPS capability may be included in the PSB 104. In this case there may be a first plurality of PSBs supporting GPS capabilities and a second plurality of PSBs that do not. In such a scenario, the position accuracy of the second plurality of PSBs may be improved by leveraging GPS information from the first plurality of PSBs, using the companion and/or OBU software to facilitate such an improvement.

In an embodiment of the present invention, the location of the person(s) 101 may be further determined by using either a low transmit power waveform, and/or a configurable transmit power waveform, at the PSB 104 to facilitate an improved accuracy of the distance to, and/or location of, the PSB 104. The detectable range of the PSB 104 may be determined by, or configured by controlling, the transmit power. As a non-limiting example the typical range of the PSB 104 may vary from approximately 50 to approximately 2000 meters depending on the transmit power that is selected in the companion application 301.

In an embodiment, context awareness may also be used to improve the determination, of any or all, of a person(s) 101 location, health, hazard, or emergency status. Context awareness may be facilitated by communications with the companion software application 301 wherein the personal electronics 103 may use other sources of information to facilitate context awareness of the PSB(s) 104 and/or person(s) 101. Other sources of information for context awareness may include a GPS position, user registered positions of interest, and user generated events, such as, but not limited to, emergency events, and/or PSB measurements. User registered positions may be further enabled through the reception of signals transmitted by fixed beacon transponders, such as Bluetooth or WiFi transponders placed in known fixed locations within a building. A PBS measurement capability may also support the determination of the PSB's context. As a non-limiting example, the measurement of temperature may support the determination of the PSB's 104 context. For instance, a particularly high temperature measured by a temperature sensor 202 of the PSB 104 may indicate a proximity to a fire, a low temperature may indicate proximity to low temperature water or snow, and/or indication of a high vibration may indicate a hazardous condition. Using a similar methodology person(s) 101 may be determined to be in a car or train accident through notification of the PSB's 104 status using a Bluetooth, or WiFi, connection from the car to the user(s) 102, and/or OBU 300. In an additional non-limiting example a PSB's context, and/or location, within a building such as an office or a hotel may be determined from the location of fixed beacons within the building. For example, a beacon placed in rooms of a hotel would enable the PSB 104 to determine which room the person 101 is located in the building to a high degree of accuracy.

According to an embodiment of the present invention, the companion software application 301 may include the ability to send alerts to users using text alerts, in app notifications, and/or smart phone facilities such as vibration alerts, sound alerts, text messages, twitter messages, and/or emails to provide an indication of a hazardous condition of person(s) 101 whom are being monitored. In app notifications may facilitate smart phone 400 features to allow the propagation of notifications to multiple personal electronic devices 103 for one or more users 102. Notification of users 102 may be customized using a friend list, circle of friends, list of group members, or other forms of personnel group management and configuration features. The smart phone 400 which hosts the companion software application 301 may also associate with OBU equipment 300 to relay alerts to OBU equipment 300 which may have an enhanced ability to alert nearby users of an imminent hazardous condition for person(s) 101 that are actively being monitored. The relay of alerts to OBU equipment 300 may also be facilitated through the in app notification feature.

According to an embodiment of the present invention, the companion software 301, in collaboration with a PSB 104, may define geographic protected areas, regions, neighborhoods, zones, or sectors. The various sectors may be defined either by the companion software 301, or through a web-based interface from the cloud 107. More than one sector may be defined for a specific PSB 104, or group of two or more PSBs 104. Sectors may overlap, and may be given different and/or specific priorities. Users 102 whom are monitoring person(s) 101 using a PSB 104 that is configured for specific sectors may be alerted to hazardous conditions in a sector using the behaviors and priority defined for the sector that the person(s) 101 might have entered. Different behaviors may be defined for person(s) entering, loitering within, or leaving a sector. A non-limiting example of this may be the configuration of a micro-location behavior for firemen who enter a burning building. The building may be configured as sector that specifies that micro-location alerts should be enabled only within the sector that is defined for the building. In another example, a sector may be defined as a vehicle, such as a marine vessel or boat. Users 102 may be alerted regarding person(s) 101 that fall off a boat using a sector behavior definition based on the person(s) 101 leaving the sector where the sector has been defined as the area of the boat.

Further, a PSB 104 that transitions from one sector to another may cause certain predefined functionality in the system. For example, a PSB 104 that leaves a particular sector that has been defined as a danger zone, may alert the user 102, and/or person(s) 101, that the person(s) 101 are no longer in a danger zone. A user 102, and/or person 101, may be alerted as to their proximity to a dangerous or hazardous condition, by using or monitoring companion software application 301.

In one embodiment, the companion software 301 may continuously run in the background of the host's (such as smart phone 400 and/or OBU 300) operating environment and only becomes active when an alert is issued. The companion software 301 may optionally continue to run in the background when notifications are sent, may come to the foreground when notifications are sent, or may be configured to come to the foreground only when certain types of notifications and/or alerts are signaled or issued. While running in the background all of the functions described in various embodiments of the present invention may be supported, but the presence of the companion software 301 may, in coordination with notifications, only become known to the user 102 when a hazardous condition for one or more person(s) 101 arises. In an alternative embodiment, the companion software 301 may only run in the background when, or in response to, an alert from a PSB 104.

Figure 6:
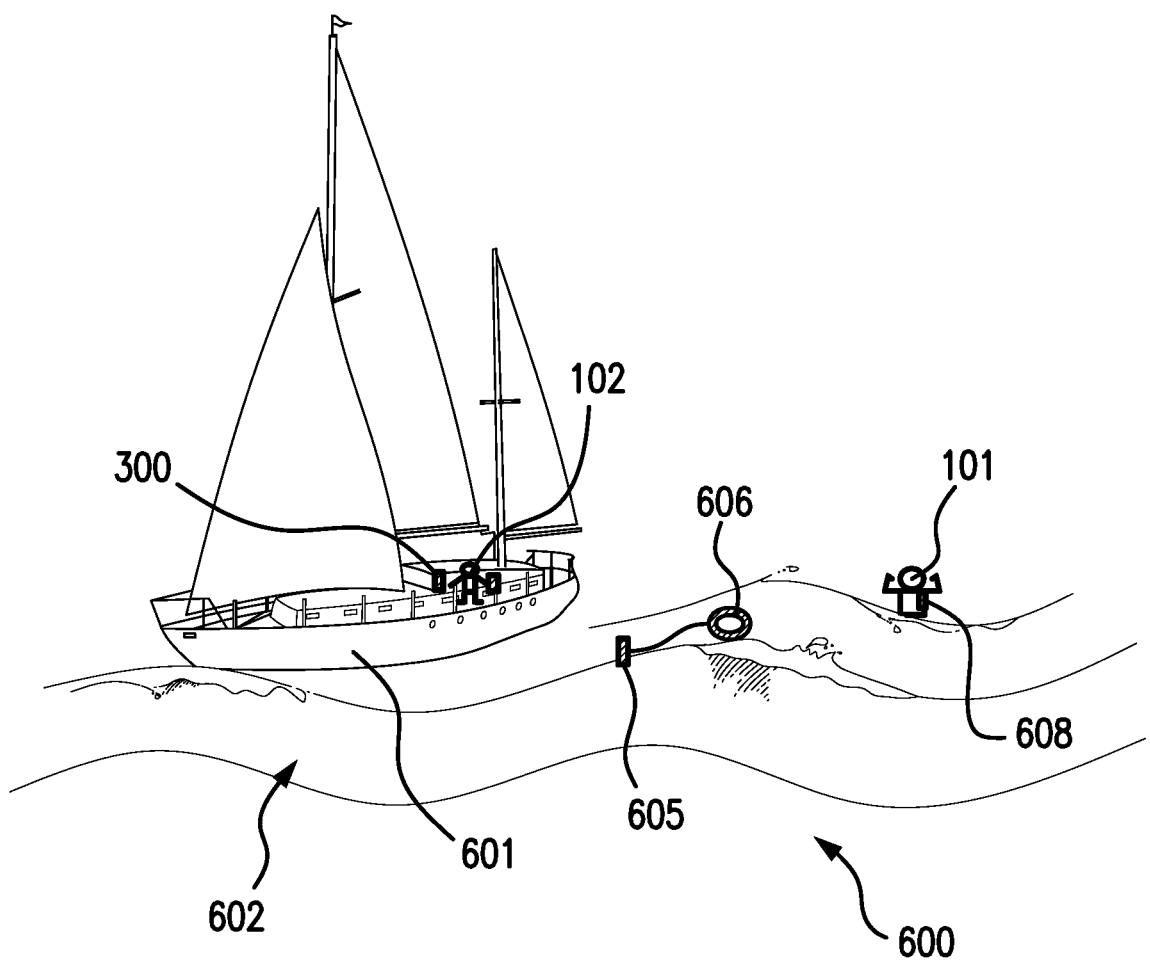
FIG. 6 illustrates application of various embodiments of the personal safety system in hazardous maritime environment.

FIG. 6 illustrates application of various embodiments of the personal safety system 600 in hazardous maritime environment. In the example illustrated in FIG. 6 a ship, or sailboat 601, may be involved in the recovery of person(s) who fell overboard 101 in the water 602. A user 102, may be a sailor on the boat holding personal electronics. An OBU 300 may also be permanently mounted on the ship to which the user 102 may interact to facilitate recovery of person(s) 101 who may have fallen overboard. Person(s) 101 who may have fallen overboard may wear a PSB 104 in their life vest 608, or floatation jacket. A PSB 104 may also be attached 605 to a life ring 606 floating in the water for person(s)' 101 in the water to use, as shown in FIG. 6.

The PSB 104 may also facilitate the location of a pickup stick for a buoy, person, or life ring in the water for boats arriving, particularly with limited visibility at night or in dense fog. In the event that the arrival of the boat 601 is in response to an emergency indication by a satellite based beacon, radio, and/or other means, the safety beacon system 600 may facilitate an improved response time for location and retrieval of person 101 in a hazardous condition.

Figure 7:
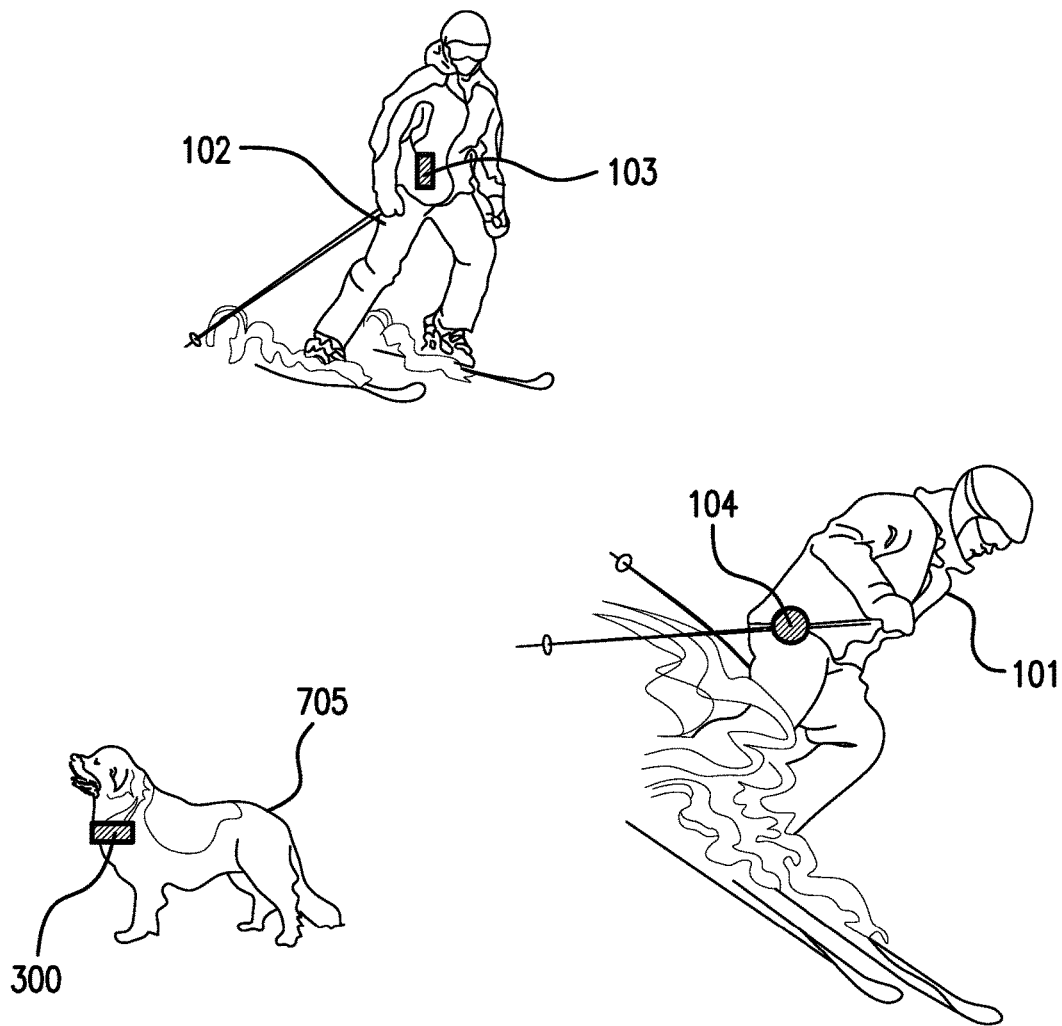
FIG. 7 illustrates application of various embodiments of the personal safety system in hazardous winter skiing environment.

FIG. 7 illustrates application of various embodiments of the personal safety system in hazardous winter skiing environment. A user, or searcher, may be a skier 102 holding or wearing personal electronics 103. Person(s) 101, at risk of becoming entrapped in an avalanche, may be wearing a PSB 104. In such an exemplary embodiment the PSB 104 may be enabled to transmit with sufficient power to facilitate the location of the entrapped person(s), even if the entrapment may be significant. In the event that person(s) 101 become entrapped in an avalanche a searcher or skier 102, may locate them using their personal electronics 103. In such case a recovery team may assemble to facilitate the recovery of person(s) 101 lost in the snow. A dog 705 may also be used to help with the recovery effort. The dog 705 may also be enabled to help the search by wearing OBU equipment 300.

Still referring to FIG. 7, the PSB 104 may also enable users 102 to monitor the condition of person(s) 101 in distress. For example, for person(s) 101 entrapped in an avalanche their body temperature may be monitored for evidence of their physical condition. In the event their body temperature falls below a predetermined level, an alarm may be indicated to user(s) 102 searching for the person(s) 101. Alternatively the person(s)' 101 spatial orientation, and/or acceleration, may facilitate an indication of a hazardous condition that may be used as another, or independent, trigger for an alarm indication to user(s) 102 searching for the person(s). The PSB 104 may monitor a person(s) 101 physiological status by employing an algorithm to assess a person(s)' 101 health status including, for example, heart rate, blood pressure, body temperature, activity status, and shiver index.

In an alternative embodiment, the PSB 104 may facilitate the situational awareness, and location, of firefighters during firefighting in building, forest, and brush fires. Fires are typically associated with extreme smoke conditions that may hinder the ability of firefighters to find their way out of a building on fire in the case of deteriorating conditions. Fire fighters may also lose visual contact with team members during the fighting of a fire, even in situations where they may be very close by.

In yet another embodiment, the PSB 104 may facilitate the situational awareness, and location, of users 101 that are either operators, or occupants of vehicles, when a hazardous condition becomes apparent. The PSB 104 may also facilitate the alert of a hazardous condition to users 102 in other vehicles that may be nearby. The PSB 104 may also enable the operators of vehicles to become known of a hazardous condition for person(s) 101 that are near but not on or in the vehicles. An example of this scenario would be person(s) in a construction site that may be near construction vehicles operated by users.

According to another illustrative embodiment, the PSB 104 may facilitate the situational awareness, location, and monitoring of public or private facilities where isolated workers may be at risk of assault, such as room maids in a hotel or other hospitality industry facilities including resorts. Children subject to loss or abduction including children in schools, playgrounds, parks, resorts, beaches, may also be monitored in real-time. Others person(s) in similar environments include caregivers such as baby sitters, nurses, teachers, aides, the elderly, and infirm, under risk of assault.

Further, the PSB 104 may also facilitate the situational awareness, location, and monitoring of professionals involved in special ops activities. It may also facilitate these functions in areas of dense populations such as sports venues including, but not limited to, sports stadiums, malls, concerts, shopping malls, amusement parks, and other public sports entertainment activities. For example, the PSB 104 may monitor the status of a selected population and provide alerts if any characteristics/parameters or conditions of the individuals go outside normal, or expected values. Each individual within the monitored population may be tagged, or assigned a unique identity stored within a PSB 104 that may be assigned to each user in the population. Tagging can be known or unknown to the tagged individual. As noted above the PSB 104 may contain sensors and communications capabilities.

According to another embodiment, the PSB 104 may be configured for use in a network wherein the network may support a mesh configuration. The individually assigned PSB 104 may be configured as a network node and may communicate with any other node within range of its communications capability. Included in the network may be one or more Command and Control nodes with access to a longer range communications capability. A logical network may include one Command and Control node and one backup Command and Control node. Individually assigned devices may be programmed to include identification in sub-groups. Individuals and sub-groups may be assigned specified ranges of location and any movement beyond that range may be indicated as a deviation and generate an alarm.

In a related embodiment, a PSB 104 may be configured for comparatively short range wireless communications wherein this will prevent long range detection providing security from unintended detection. The wireless range may be optimally controlled through the use of mesh networking or repeaters. Unauthorized penetration of a portal could initiate surreptitious attachment of a tag identified as intruder. Preauthorized display devices will be able to display all tagged individuals, selected individuals, all sub-groups and selected sub-groups of individuals as well as their respective or collective status.

In summary, improved methods and systems that enable enhanced safety and facilitate micro-locating during sporting events, professional and other activities in marine, nautical, winter, fire, smoke, vehicular, professional and other potentially hazardous environments are provided herein. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:
1. A system for enhancing the safety of one or more persons, the system comprising:
   a Personal Safety Beacon (PSB) device comprising:
      an accelerometer sensor,
      a moisture sensor,
      a vibration sensor and an atmospheric sensor, configured to perform a plurality of measurements indicative of environmental conditions encountered by a person being monitored;

a biological processes sensor configured to perform a plurality of measurements indicative of biological conditions encountered by the person; and an onboard logging facility on the PSB device and configured to store a log history of the measurements indicative of environmental conditions and the measurements indicative of biological conditions;

a water activated switch that when activated indicates a hazardous or unsafe condition; and one or more portable electronic devices that is in continuous communication with the PSB device, the one or more portable electronic device hosting a monitoring application that monitors the person, wherein the monitoring application is configured to notify a user upon detecting one or more hazardous or unsafe conditions based on the information provided by the PSB device and inquire the onboard logging facility for the log history, wherein notification provided to the user includes both one or more environmental conditions and one or more biological conditions currently being encountered by the person being monitored and previous to the detecting the one or more hazardous or unsafe conditions.

2. The system of claim 1, wherein the one or more portable electronic devices comprise one or more of the following: a smart phone, magnetic health band, smart watch, tablet, iBeacon, iPhone, iPad, Apple watch, Bluetooth watch, laptop, or the like, and wherein the PSB device further comprises a water activated switch.

3. The system of claim 1, wherein the biological conditions encountered by the person being monitored includes one or more of: heart rate; blood pressure; sweat index; shiver index; body temperature; oxygen level, dialyses status; and respiration status of the person being monitored.

4. The system of claim 1, wherein the PSB device is further configured to provide situational awareness data related to the person being monitored.

5. The system of claim 1, further comprising an On Board Unit (OBU) device attached to a vehicle located in or near the geographic position where the person being monitored may be at risk for harm from hazardous environmental conditions, wherein the OBU device is in communication with the PSB device and the one or more portable electronic devices.

6. The system of claim 5, wherein the OBU device is permanently attached to the vehicle.

7. The system of claim 5, wherein the OBU device is semi-permanently attached to the vehicle.

8. The system of claim 1, wherein the PSB device is further configured to provide location coordinates of the person being monitored, in response to detecting hazardous conditions, and wherein the monitoring application is configured to render the location coordinates to a user, in response to receiving the location coordinates from the PSB device.

9. The system of claim 1, wherein the person being monitor requires a water rescue, wherein the PSB device is attached to the person's life vest and wherein another PSB device is attached to a life ring utilized for the water rescue.

10. The system of claim 1, wherein the PSB device includes a transceiver configured to perform a wireless signal transmission triggered by an event and wherein the transceiver is configured to operate according to a plurality of power operation modes.

11. A method for enhancing the safety of a person, the method comprising:

coupling a Personal Safety Beacon (PSB) device with a person being monitored, the PSB device comprising:
an accelerometer sensor,
a moisture sensor,
a vibration sensor, and
an atmospheric sensor, each configured to perform a plurality of measurements indicative of environmental conditions encountered by a person being monitored;
a biological processes sensor configured to perform a plurality of measurements indicative of biological conditions encountered by the person; and
an onboard logging facility on the PSB device and configured to store a log history of the measurements indicative of environmental conditions and the measurements indicative of biological conditions; and
a water activated switch that when activated indicates a hazardous or unsafe condition;

performing, by the PSB device, measurements indicative of environmental conditions and biological conditions encountered by the person being monitored;

storing a log history of the environmental conditions and the biological conditions encountered on the onboard logging facility;

transmitting, periodically, a unique identifier associated with the PSB device to one or more portable electronic devices that are in continuous communication with the PSB device, wherein the transmission includes information related to the plurality of measurements performed by the PSB device;

monitoring a status of the person being monitored by a monitoring application that is hosted by the one or more portable electronic devices based on the information provided by the PSB device; and upon detecting one or more hazardous or unsafe conditions, inquiring the onboard logging facility for the log history, wherein notification provided to the user includes both one or more environmental conditions and one or more biological conditions currently being encountered by the person being monitored and previous to the detecting the one or more hazardous or unsafe conditions.

12. The method of claim 11, wherein the biological conditions encountered by the person being monitored includes one or more of: heart rate; blood pressure; sweat index; shiver index; body temperature; oxygen level, dialyses status; and respiration status of the person being monitored.

13. The method of claim 11, wherein the one or more portable electronic devices comprise one or more of the following: a smart phone, health band, smart watch, tablet, iBeacon, iPhone, iPad, Apple Watch, Bluetooth watch, laptop, or the like, wherein detecting one or more hazardous or unsafe conditions comprises activation of a water activated switch.

14. The method of claim 11, further comprising attaching an On Board Unit (OBU) device to a vehicle located in or near the geographic position where the person being monitored may be at risk for harm from hazardous environmental conditions, wherein the OBU device is in continuous communication with the PSB device and the one or more portable electronic devices.

15. The method of claim 11, further comprising determining a geographic position of the person being monitored using one or more localization techniques based on the information provided by the PSB device and presenting the geographic position of the person to a user.

16. The method of claim 14, wherein attaching an OBU device to a vehicle comprises permanently mounting the OBU device to a ship for monitoring safety of the person in hazardous maritime environment.

17. The method of claim 11, further comprising triggering an alarm by the monitoring application responsive to detecting one or more hazardous conditions.

18. The method of claim 11, further comprising calibrating the PSB device using the OBU device.

19. The method of claim 17, wherein triggering an alarm comprises sending a notification to a user, the notification indicative of the hazardous conditions detected in the vicinity of the person being monitored.

20. The method of claim 17, wherein the PSB device is configured to switch to a power saving mode of operation based at least in part on the plurality of measurements indicative of environmental conditions encountered by the person being monitored.

* * * * *